Patented Oct. 10, 1950

2,525,247

UNITED STATES PATENT OFFICE 2,525,247

CATION EXCHANGE RESINS

Jack T. Thurston, Riverside, Conn., assignor to American Cyanamid Company, New York, N. Y., a corporation of Maine No Drawing. Application March 5, 1946, Serial No. 652,235

3 Claims. (Cl. 260—67)

This invention relates to cation active materials; that is, to materials which exchange cations in, or extract cations from, liquid media.

An object of the present invention is to provide a substantially water-insoluble resin having a relatively high capacity for the absorption of cations.

Another object of the present invention is the removal of cations from liquid media by means of a water-insoluble resin.

Still another object of this invention is to provide a process for the preparation of a substantially water-insoluble resin having a capacity for the absorption of cations from solutions.

These and other objects are attained by treating a furfural resin with a strong sulfonating or phosphonating agent and bringing a liquid into contact with the resulting resinous material.

In the past, furfural has been polymerized in the presence of either an acid or a base to form resins. These resins do not exhibit any cation exchange activity.

The invention will be described in greater detail in conjunction with the following specific examples which are merely illustrative and not intended to restrict the scope of the invention to the details therein set forth. The proportions are in parts by weight.

Example 1

606 parts of 95% furfural (6 mols)
295.5 parts of concentrated 37% hydrochloric acid (3 mols)
500 parts of ethylene dichloride
146 parts of chlorosulfonic acid The hydrochloric acid is added slowly with stirring to the furfural. In thirty minutes a soft black gel forms with the evolution of heat which increases until the water present begins to boil out and the resin breaks into small particles. After standing for about 12 hours, the resin is granulated and cured for four hours at 50° C. and four hours at 100° C. The cured resin is then ground and screened.

73 parts of 20–40 mesh resin prepared as described above is suspended in the ethylene dichloride, and the chlorosulfonic acid is added slowly with stirring. The sulfonation is complete after about 18 hours at 20° C. The reaction mixture is then poured into chipped ice and the resin washed with water, then alcohol and finally again with water.

Half of the sulfonated resin is evaluated wet and found to have a capacity for the removal of cations from solution of 18.7 kilograins of $CaCO_3$ per cubic foot of resin and a density of 18.8 lbs./ft.$^3$.

The other half of the resin is dried for four hours at 100° C. before evaluation. It has a capacity of 20.7 kgr./ft.$^3$ and a density of 18.0 lbs./ft.$^3$

Example 2

2424 parts of 95% furfural (24.0 mols)
186 parts of concentrated 95.5% sulfuric acid (1.8 mols)
79.5 parts of sodium carbonate (0.75 mol)
150 parts of ethylene dichloride
41.5 parts of fuming sulfuric acid (25% $SO_3$)

The concentrated sulfuric acid is added slowly with stirring to the furfural. The temperature rises to 40° C. and the solution is gelled in thin layers of about an inch thick. At the end of about an hour gelation has occurred, and the gel is permitted to stand for about 12 hours.

The gel is granulated, washed with water and allowed to stand in an aqueous solution of the sodium carbonate for one hour. The resin is then washed free of carbonate and cured for four hours at 50° C. and for about two hours at 100° C. The cured resin is ground and screened.

41.5 parts of the 20–40 mesh resin prepared as described above is suspended in the ethylene dichloride, and the fuming sulfuric acid is added slowly with stirring. After sulfonation is complete, about 5.5 hours at temperatures from 20°–50° C., the resin is treated as described in Example 1. The wet resin has a capacity of 10.0 kgrs. of $CaCO_3$/ft.$^3$ and a density of 21.4 lbs./ft.$^3$; the dry resin, a capacity of 9.0 kgrs. of $CaCO_3$/ft.$^3$ of resin and a density of 22.7 lbs./ft.$^3$.

Example 3

Example 1 is repeated except that the chlorsulfonic acid is replaced by 102 parts of phosphorus oxychloride. The resin obtained has a good capacity for the removal of cations from solutions.

Example 4

Example 2 is repeated except that 83 parts of fuming sulfuric acid are used. The resulting resin has a wet capacity of 12.7 kgrs. $CaCO_3$/ft.$^3$ of resin and a density of 21.6 lbs/ft.$^3$; a dry capacity of 11.0 kgrs. $CaCO_3$/ft.$^3$ of resin and a density of 21.6 lbs./ft.$^3$.

Any strong sulfonating agent may be used in the preparation of the products of the present invention. Examples of suitable compounds include concentrated sulfuric acid, chlorsulfonic acid, oleum or fuming sulfuric acid, and sulfur trioxide. Similarly, other phosphonating agents such as phosphorus pentoxide, phosphorus pentachloride, etc., may be used in place of the phosphorus oxychloride.

The invention is in no sense limited to the use of ethylene dichloride as medium for the furfural resin in the sulfonation step. Other highly halogenated aliphatic hydrocarbons such as pentachloroethane, hexachloropropane, etc., may be used just as effectively.

The gelation of furfural polymer resins is an extremely exothermic reaction, and considerable carbonization may occur due to the high temperatures resulting therefrom. For this reason I prefer to carry out gelation of the resin in thin layers in order that the heat evolved may be better dissipated. It is, of course, not necessary to the spirit of the invention that this particular procedure be followed.

It will be apparent from the data given in the examples that the capacities of the dried resins are generally lower than those of the wet resins. While I do not wish to be limited to any particular explanation, this lower capacity may be due to the decomposition of active groups in the resin by the drying heat or perhaps to collapse of the gelled structure. Furthermore, it may be because the resin, after sulfonation or phosphonation, is in an activated state and it has been found that a more marked decrease in capacity is obtained upon drying if a resin is in the activated state when it is dried.

The resins of the present invention may be cured by heating at a temperature ranging from room temperature to about 150° C. for from several hours to a day.

My new resinous materials may be used alone or in admixture with other cation active materials. Furthermore, my resins may be applied before gelation to a suitable carrier such as diatomaceous earth, clays, charcoal, etc. In this way, the active resin is spread on the surface of a relatively inert material and this enables one to employ a smaller quantity of resin than otherwise to obtain the same active area.

The granular resinous materials prepared according to my invention are useful in the removal of cations from liquid media, especially from aqueous solutions. The resins may be used in the hydrogen-activated form to remove cations from solutions of bases. My resinous cation-active materials may also be employed as exchange materials in accordance with the principles applied to the use of the natural and synthetic zeolites. Thus, the resin may be activated with a sodium salt such as sodium chloride and upon contact with a solution containing calcium, magnesium or other cations, an exchange of the latter ions for the sodium ions takes place.

The activating solutions or regenerating solutions are dilute acid solutions or dilute salt solutions, e. g. about 0.2%–10% of sulfuric acid, hydrochloric acid, sodium chloride, potassium chloride, etc.

To be sufficiently insoluble for practical use in the art of water purification, a resin should have a sufficiently low solubility that it will not be dissolved away rapidly by the solution to be treated. Thus, water should not dissolve more than about one part of resin in 1,000 parts of water when passed through a bed of resin after the first cycle comprising an activation, exhaustion and reactivation of the resin.

My resinous materials are useful for a wide variety of purposes. Some of the uses which may be mentioned by way of example are: water purification; purification of aqueous solutions containing sugar including sugar juices; purification of water from lead pipes; removal of heavy metal ions from food, beverages and pharmaceutical products; decolorization of solutions containing coloring matters such as sugar solutions, etc. My condensation products may also be employed to recover valuable metal cations from dilute solutions, e. g., gold from sea water, chromium from chrome tanning liquors, silver from photographic baths, etc. Another important application of my materials is in the absorption or adsorption of gases such as ammonia, amines, e. g., triethyl amine, methyl amine, etc., from fluid media, the gases being either dissolved in a liquid or in vapor form.

My condensation products may be used in processes such as the reduction of ferric ions to ferrous ions, of magnesium ions to a lower degree of oxidation and of other cations to the metallic state, as well as for many other reduction purposes.

I claim:

1. A process which comprises suspending granular, cured acid resinified furfural having no cation exchange activity in a highly halogenated liquid aliphatic hydrocarbon, treating said suspension with a strong sulfonating agent until cation exchange activity is imparted to the resin, and comminuting the resin so obtained.

2. A process according to claim 1 in which the sulfonating agent is fuming sulfuric acid.

3. A process in accordance with claim 1 in which the sulfonating agent is chlorosulfonic acid.

JACK T. THURSTON.

REFERENCES CITED

The following references are of record in the file of this patent:

UNITED STATES PATENTS

| Number | Name | Date |
|---|---|---|
| 1,682,934 | Richardson | Sept. 4, 1928 |
| 2,244,512 | Brandt | June 3, 1941 |
| 2,251,234 | Swain | July 29, 1941 |
| 2,333,142 | Behrman | Nov. 2, 1943 |
| 2,366,007 | D'Alelio | Dec. 26, 1944 |
| 2,372,233 | Thurston | Mar. 27, 1945 |
| 2,383,790 | Harvey | Aug. 28, 1945 |
| 2,393,249 | Holmes | Jan. 22, 1946 |
| 2,404,367 | Durant | July 23, 1946 |
| 2,408,615 | Dudley | Oct. 1, 1946 |
| 2,469,472 | Nachod | May 10, 1949 |